United States Patent
Wang et al.

(10) Patent No.: US 9,369,987 B2
(45) Date of Patent: Jun. 14, 2016

(54) METHOD AND SYSTEM FOR ESTIMATING DISTANCE BETWEEN TWO DEVICES IN WIRELESS ENVIRONMENT

(71) Applicants: Dongbing Wang, Beijing (CN); Yi Sun, Beijing (CN); Bin Da, Beijing (CN); Wei Wang, Beijing (CN); Yindong Zhang, Beijing (CN)

(72) Inventors: Dongbing Wang, Beijing (CN); Yi Sun, Beijing (CN); Bin Da, Beijing (CN); Wei Wang, Beijing (CN); Yindong Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/623,937

(22) Filed: Feb. 17, 2015

(65) Prior Publication Data
US 2015/0245311 A1    Aug. 27, 2015

(51) Int. Cl.
| | | |
|---|---|---|
| *H04W 4/02* | (2009.01) | |
| *H04W 64/00* | (2009.01) | |
| *H04W 76/04* | (2009.01) | |
| *H04L 12/26* | (2006.01) | |
| *H04L 12/24* | (2006.01) | |
| *H04W 88/08* | (2009.01) | |

(52) U.S. Cl.
CPC ............ *H04W 64/003* (2013.01); *H04L 41/145* (2013.01); *H04L 43/087* (2013.01); *H04W 76/046* (2013.01); *H04W 88/08* (2013.01)

(58) Field of Classification Search
CPC ....... H04W 4/02; H04W 4/023; H04W 4/025; G01S 5/00; G01S 5/02; G01S 5/0273
USPC ......... 455/456.1, 456.3, 456.5; 342/450, 458, 342/463, 464, 465
See application file for complete search history.

(56) References Cited

U.S. PATENT DOCUMENTS

| | | | | |
|---|---|---|---|---|
| 2005/0124368 | A1* | 6/2005 | Diao | ...................... H04B 1/7113 455/522 |
| 2010/0315289 | A1* | 12/2010 | Nurmela | .................. G01S 11/06 342/385 |
| 2013/0045750 | A1* | 2/2013 | Kim | .......................... G01S 5/14 455/456.1 |
| 2013/0336485 | A1 | 12/2013 | Da et al. | |
| 2014/0241207 | A1 | 8/2014 | Zhang et al. | |
| 2014/0243016 | A1* | 8/2014 | Denis | ...................... G01S 5/021 455/456.1 |

FOREIGN PATENT DOCUMENTS

JP    2014-039261    2/2014

* cited by examiner

*Primary Examiner* — Siu Lee
(74) *Attorney, Agent, or Firm* — IPUSA, PLLC

(57) ABSTRACT

Disclosed is a method of determining a distance between a first device and a second device in a wireless environment. The method includes steps of obtaining environmental parameters in a LOS propagation environment; determining whether the environment between the first device and the second device is the LOS propagation environment or a NLOS propagation environment; and calculating, based on the determination result of the determining step, the distance between the first device and the second device by utilizing the environmental parameters in the LOS or NLOS propagation environment as well as a path loss model.

9 Claims, 15 Drawing Sheets

| PN ID | RSSx$_1$ | RSSx$_2$ | ... | RSSx$_k$ | MEAN VALUE $\mu$ | STANDARD DEVIATION $\sigma$ |
|---|---|---|---|---|---|---|
| PN$_1$ | RSS$_{11}$ | RSS$_{12}$ | ... | RSS$_{1k}$ | $\mu_1$ | $\sigma_1$ |
| PN$_2$ | RSS$_{21}$ | RSS$_{22}$ | ... | RSS$_{2k}$ | $\mu_2$ | $\sigma_2$ |
| ... | ... | ... | ... | ... | ... | ... |
| PN$_n$ | RSS$_{n1}$ | RSS$_{n2}$ | ... | RSS$_{nk}$ | $\mu_n$ | $\sigma_n$ |

$RSS_{LOS} = RSS_m + N$ $RSS_{NLOS} = RSS_m + N + N_{NLOS} + N_{multipath}$

DETERMINE LOS OR NLOS ENVIRONMENT:

$$\begin{cases} \sigma < k\sigma_0 & \text{LOS ENVIRONMENT} \\ \sigma \geq k\sigma_0 & \text{NLOS ENVIRONMENT} \end{cases}$$

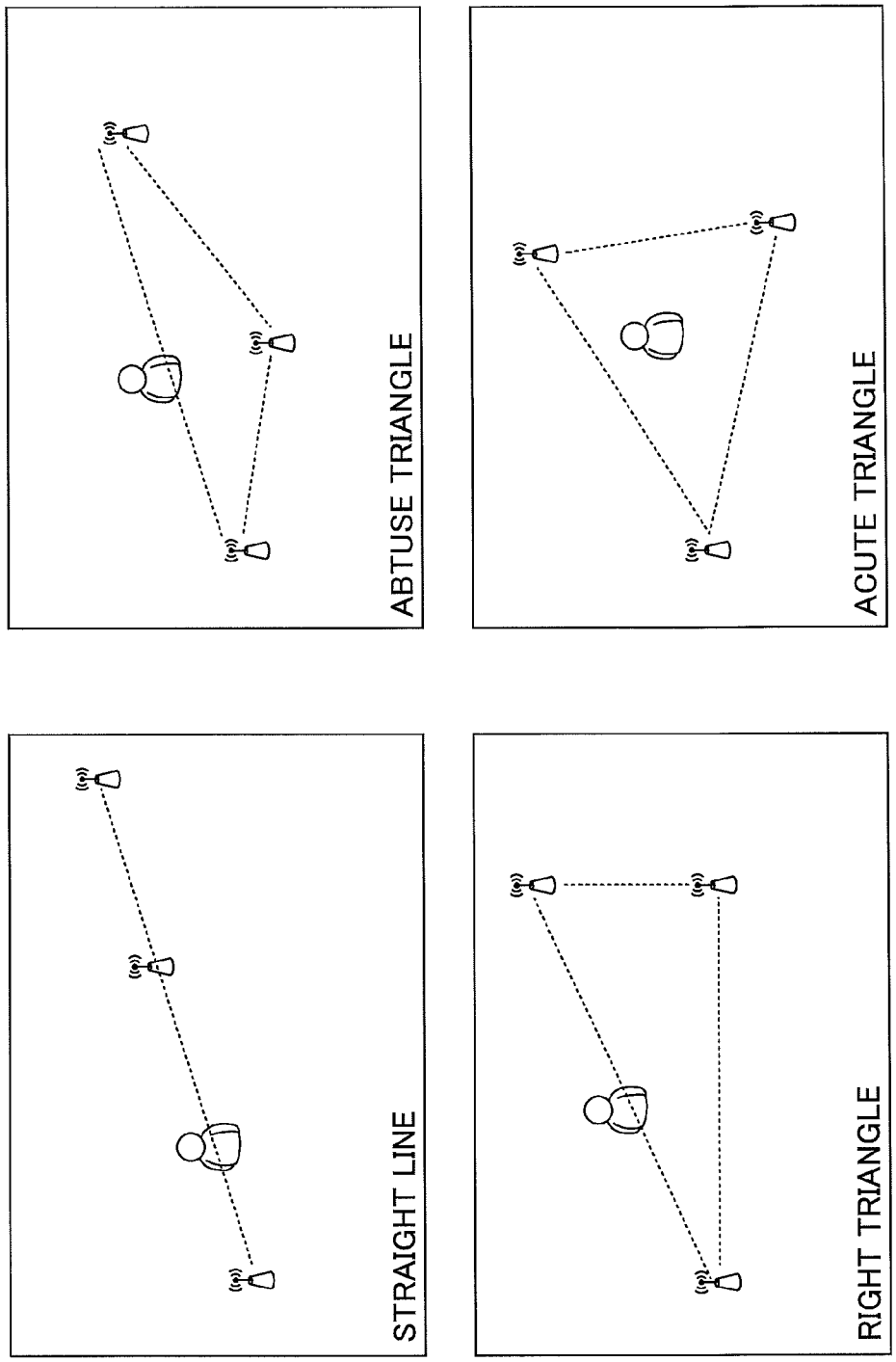

METHOD AND SYSTEM FOR ESTIMATING DISTANCE BETWEEN TWO DEVICES IN WIRELESS ENVIRONMENT

BACKGROUND OF THE INVENTION

1. Field of the Invention

The present invention relates to the field of wireless communications, and particularly relates to a method and system for estimating the distance between two devices (nodes) in a wireless environment.

2. Description of the Related Art

Today, in the field of the wireless communications, the positioning of a mobile device is playing a very important role in a navigation system or location based service. By positioning the mobile device, it is possible to know the position of the device or the user who owns the mobile device.

In the conventional positioning techniques, it is possible to estimate, on the basis of a received signal strength (RSS) value, the distance between a Wi-Fi signal transmitter whose position has been known and a mobile device which receives the Wi-Fi signals and needs to be positioned, so that it is possible to estimate the position of the mobile device.

However, in an actual environment, there are probably some obstacles such as a wall, a door, and a post. As a result, the RSS value may dramatically changes due to these kinds of obstacles. This may result in obtaining an inaccurate distance when estimating, by utilizing the conventional techniques, the distance between two device. And thus, when determining, by utilizing this kind of inaccurate distance, the position of a mobile device needing to be positioned, inaccurate distance information may be acquired.

Therefore, it is necessary to provide a method and system by which it is possible to more accurately estimate the distance between two devices and/or to more accurately determine the position of a device needing to be positioned.

SUMMARY OF THE INVENTION

In general, the propagation conditions of a wireless communications system may be divided into a line-of-sight (LOS) propagation condition and a non-line-of-sight (NLOS) propagation condition.

In a case of the LOS propagation condition, radio signals unshieldedly propagate in a straight line between a transmitter and a receiver. This requires that in the first Fresnel zone, there should not be an obstacle shielding radio waves; otherwise, the related RSS value may decrease apparently. The range of the first Fresnel zone relies on the frequency of the radio waves and the distance between the transmitter and the receiver. In this case, in general, it is necessary to guarantee that there isn't an obstacle in a range of 0.6 times a focal length in the first Fresnel zone.

On the other hand, in a case where there is an obstacle, radio waves may be reflected, scattered, and diffracted before they reach the receiver. This kind of propagation condition is regarded as the NLOS propagation condition. In this case, radio waves may be received via various paths, and the effects of multipath may result in a series of problems including the desynchronization of time delay, signal attenuation, the change of polarization, link instability, etc. As a result, in this case, the RSS value measured on the base of the radio waves received by the receiver is also different from that in the case of the LOS propagation condition.

According to a first aspect of the present invention, a method of determining the distance between a first device and a second device in a wireless environment is provided. The method includes:

an obtention step of obtaining first environmental parameters in a LOS propagation environment;

a determination step of determining, based on a relationship between amounts of RSS jitter in the LOS propagation environment and a NLOS propagation environment, whether an environment between the first device and the second device is the LOS propagation environment or the NLOS propagation environment; and a calculation step of calculating, based on a determination result of the determination step, a distance between the first device and the second device, wherein, if the determination result is that the environment between the first device and the second device is the LOS propagation environment, then the distance between the first device and the second device is calculated based on the first environmental parameters and a path loss model, and if the determination result is that the environment between the first device and the second device is the NLOS propagation environment, then second environmental parameters in the NLOS propagation environment are obtained, and the distance between the first device and the second device is calculated based on the second environmental parameters and the path loss model.

According to a second aspect of the present invention, a system for determining the distance between a first device and a second device in a wireless environment is provided. The system includes:

an obtention device configured to obtain first environmental parameters in a LOS propagation environment;

a determination device configured to determine, based on a relationship between amounts of RSS jitter in the LOS propagation environment and a NLOS propagation environment, whether an environment between the first device and the second device is the LOS propagation environment or the NLOS propagation environment; and a calculation device configured to calculate, based on a determination result of the determination device, a distance between the first device and the second device, wherein, if the determination result is that the environment between the first device and the second device is the LOS propagation environment, then the distance between the first device and the second device is calculated based on the first environmental parameters and a path loss model, and if the determination result is that the environment between the first device and the second device is the NLOS propagation environment, then second environmental parameters in the NLOS propagation environment are obtained, and the distance between the first device and the second device is calculated based on the second environmental parameters and the path loss model.

According to a third aspect of the present invention, a method of positioning a device in a wireless environment is provided. The method includes:

an obtention step of obtaining environmental parameters in the wireless environment;

a determination step of determining, based on a relationship between amounts of RSS jitter in a LOS propagation environment and a NLOS propagation environment, whether the environment between each first device in a first set of first devices, whose positions have been known, and a second device, which needs to be positioned, in the wireless environment is the LOS propagation environment or the NLOS propagation environment;

a selection step of selecting a second set from the first set;

a calculation step of calculating, based on the environmental parameters and a path loss model, a distance between each first device in the second set and the second device, wherein, if an environment between the corresponding first device in the second set and the second device is the LOS propagation environment, then the environmental parameters are those in the LOS propagation environment, otherwise the environmental parameters are those in the NLOS propagation environment; and an estimation step of estimating, based on the distance between each first device in the second set and the second device as well as the position of each first device in the second set, a position of the second device.

According to a fourth aspect of the present invention, a system for positioning a device in a wireless environment is provided. The system includes:

an obtention device configured to obtain environmental parameters in the wireless environment;

a determination device configured to determine, based on a relationship between amounts of RSS jitter in a LOS propagation environment and a NLOS propagation environment, whether an environment between each first device in a first set of first devices, whose positions have been known, and a second device, which needs to be positioned, in the wireless environment is the LOS propagation environment or the NLOS propagation environment;

a selection device configured to select a second set from the first set;

a calculation device configured to calculate, based on the environmental parameters and a path loss model, a distance between each first device in the second set and the second device, wherein, if an environment between the corresponding first device in the second set and the second device is the LOS propagation environment, then the environmental parameters are those in the LOS propagation environment, otherwise, the environmental parameters are those in the NLOS propagation environment; and an estimation device configured to estimate, based on the distance between each first device in the second set and the second device as well as the position of each first device in the second set, a position of the second device.

As a result, by utilizing the methods and systems, LOS and NLOS propagation environments may be distinguished, so that different environmental parameters may be adopted according to the LOS and NLOS propagation environments, and the distances between two devices in the LOS and NLOS propagation environments may be calculated more accurately. In this way, by utilizing these kinds of more accurately calculated distances, for example, it is possible to more accurately determine the position of a device needing to be positioned. This may play an important role when it is necessary to accurately estimate the distance between two devices, and to accurately determine the position of a device needing to be positioned in a complicated wireless environment, particularly, in an indoor wireless environment.

BRIEF DESCRIPTION OF THE DRAWINGS

FIG. 7C illustrates the principle of the selection shown in FIG. 7B;

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
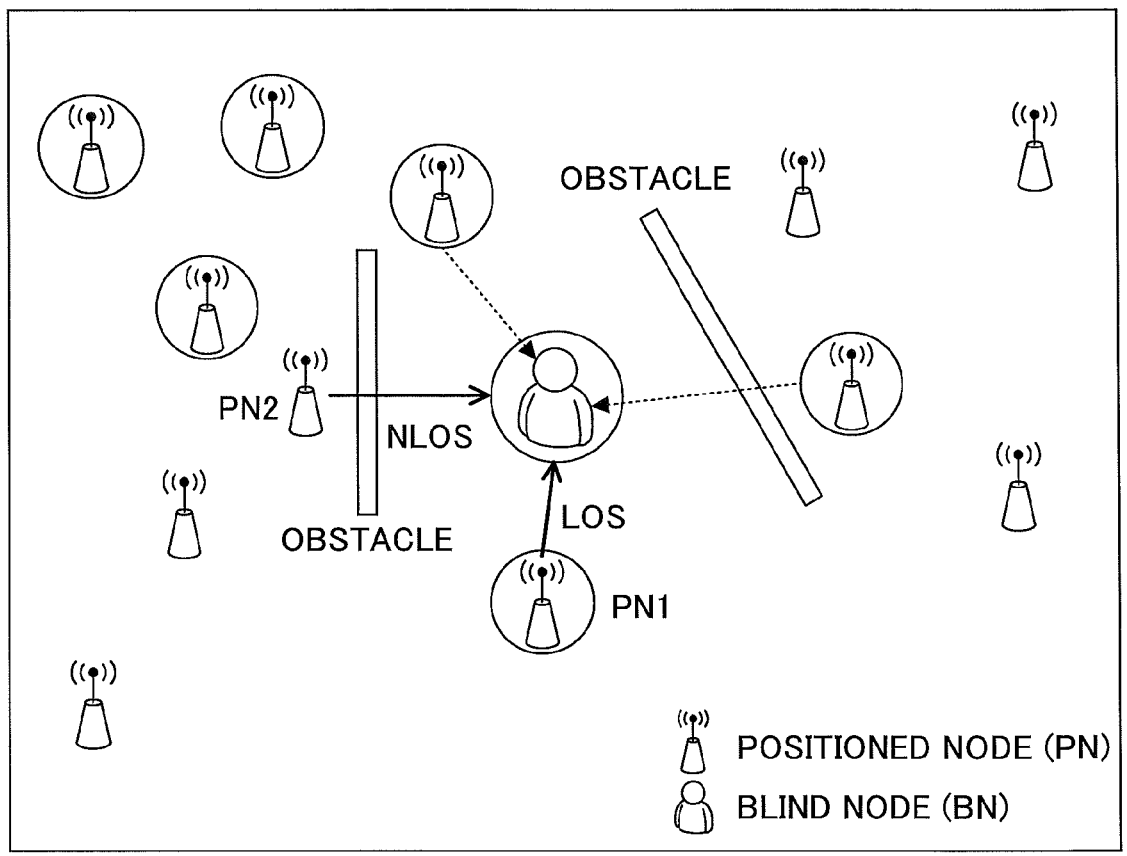
FIG. 1 illustrates a scenario in which the present invention may be applied.

FIG. 1 illustrates a scenario in which the present invention may be applied.

In general, in a wireless environment such as an indoor wireless environment, the environment between two devices may be divided into LOS and NLOS propagation environments (hereinafter, also called LOS and NLOS environments). As shown in FIG. 1, there are plural positioned nodes and a blind node. For example, regarding a positioned node PN1, there isn't an obstacle between this positioned node PN1 and the blind node. This kind of propagation environment may be regarded as the LOS environment, and this kind of positioned node PN1 is called a positioned node in the LOS environment. On the other hand, regarding a positioned node PN2, there is an obstacle between this positioned node PN2 and the blind node. This kind of propagation environment may be regarded as the NLOS environment, and this kind of positioned node PN2 is called a positioned node in the NLOS environment.

Here it should be noted that the positioned nodes may be devices whose positions have been known, and may include access points, wireless routers, Wi-Fi embedded devices, etc. On the other hand, the blind node may be a device from which the distance to a positioned node needs to be calculated or whose position needs to be determined, and may include a handheld device such as a cellular phone, a notebook computer, a personal digital assistant (PDA), a tablet computer, etc. In addition, sometimes a positioned node is described as a PN, and a blind node is described as a BN.

Figure 2:
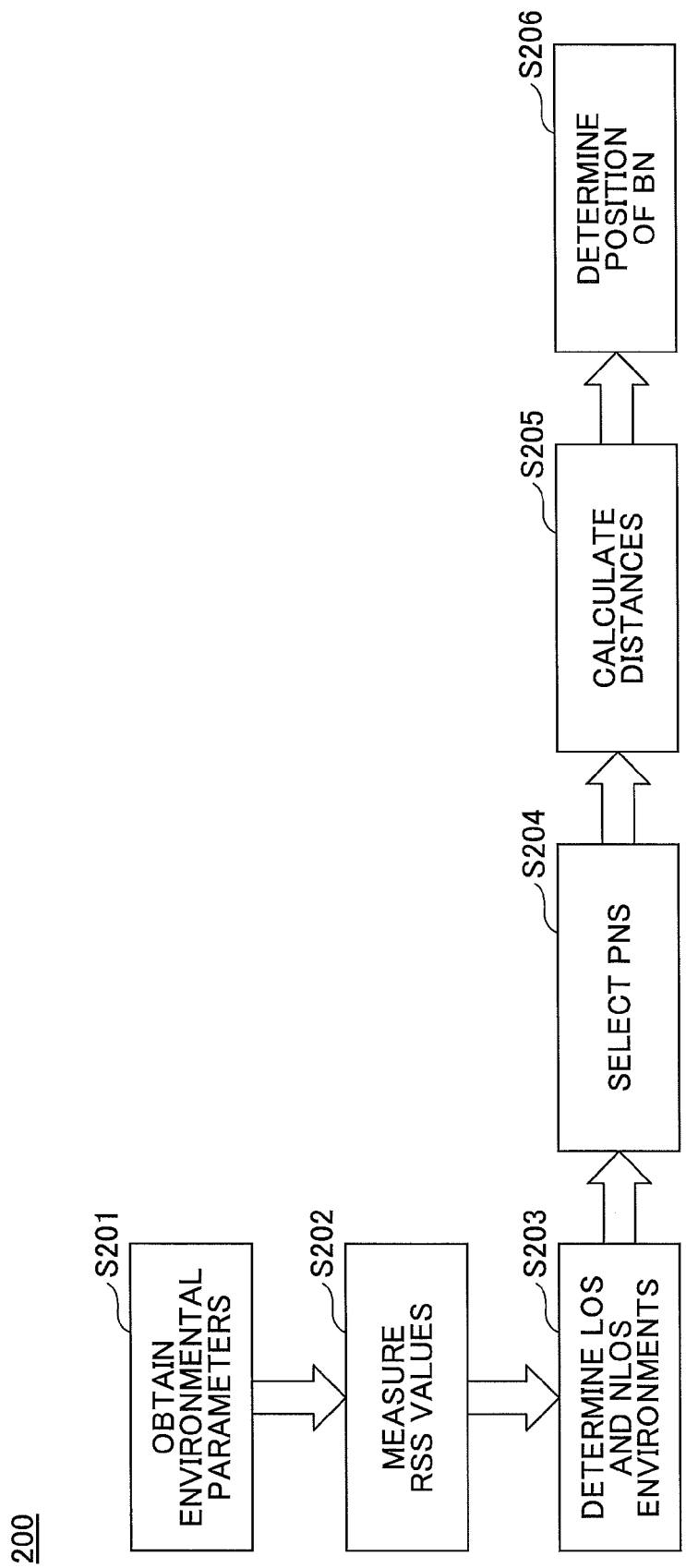
FIG. 2 is a flowchart of a method of estimating the distance between two devices so as to position a device in a wireless environment according to an embodiment of the present invention.

FIG. 2 is a flowchart of a method 200 of estimating the distance between two devices so as to position a device in a wireless environment according to an embodiment of the present invention.

As shown in FIG. 2, the method 200 includes STEPS S201, S202, S203, S204, S205, and S206.

In STEP S201, environmental parameters in a LOS environment are obtained. Here it should be noted that for example, it is possible to utilize plural reference nodes, whose position have been known, in a LOS environment as well as a path loss model to obtain the environmental parameters in the LOS environment as will be described below, or to directly obtain predetermined environmental parameters in a LOS environment from the outside.

In an example, it is possible to periodically conduct STEP S201 so as to obtain more real-time and accurate environmental parameters.

In an example, in STEP S201, it is also possible to obtain environmental parameters in a NLOS environment as will described below.

In STEP S202, a blind node obtains RSS values. Here it should be noted that the blind node may measure the RSS values on the basis of radio signals sent from all probable positioned nodes.

In an example, it is possible to exclude a positioned node if the RSS value corresponding to this positioned node is not within a predetermined threshold range. The reason is that perhaps a RSS value not within the predetermined threshold range is measured due to an unexpected event such as momentary obstruction of a person or momentary signal interference. As a result, by excluding this kind of positioned node, it is possible to utilize only those RSS values within the predetermined threshold range so as to more accurately estimate the distance between two devices, and then to more accurately position a device.

After the blind node obtains the RSS values, for each positioned node, it is possible to calculate the amount of RSS jitter, the mean value of the RSS values, and the standard deviation of the RSS values related to the corresponding positioned node.

In STEP S203, it is determined whether the environment between each positioned node and the blind node is a LOS or NLOS environment. Here it should be noted that it is possible to determine, on the basis of a relationship of the amounts of RSS jitter in the LOS and NLOS environments, whether the environment between each positioned node and the blind node is the LOS or NLOS environment.

In STEP S204, plural positioned nodes are selected according to a predetermined rule. Here it should be noted that it is possible to select three positioned nodes so as to calculate the distance between each of the selected positioned nodes and the blind node. In this way, as will be described below, by using these kinds of distances, it is possible to utilize a trilateration based positioning approach to determine the position of the blind node.

In STEP S205, the distance between each of the selected positioned nodes and the blind node is calculated. Here it should be noted that if the environment between a selected positioned node and the blind node is a LOS environment, then it is possible to directly calculate, on the basis of the environmental parameters in the LOS environment obtained in STEP S201 as well as the path loss model, the distance between this selected positioned node and the blind node. On the other hand, if the environment between a selected positioned node and the blind node is a NLOS environment, then it is possible to calculate environmental parameters in the NLOS environment as will be described below, and then to obtain, on the basis of the environmental parameters in the NLOS environment as well as the path loss model, the distance between this selected node and the blind node.

In STEP S206, on the basis of the distance between each of the selected positioned nodes and the blind node as well as the position of each of the selected positioned nodes, it is possible to determine, by utilizing, for example, the trilateration based positioning approach, the position of the blind node as will be described below.

Figure 3:
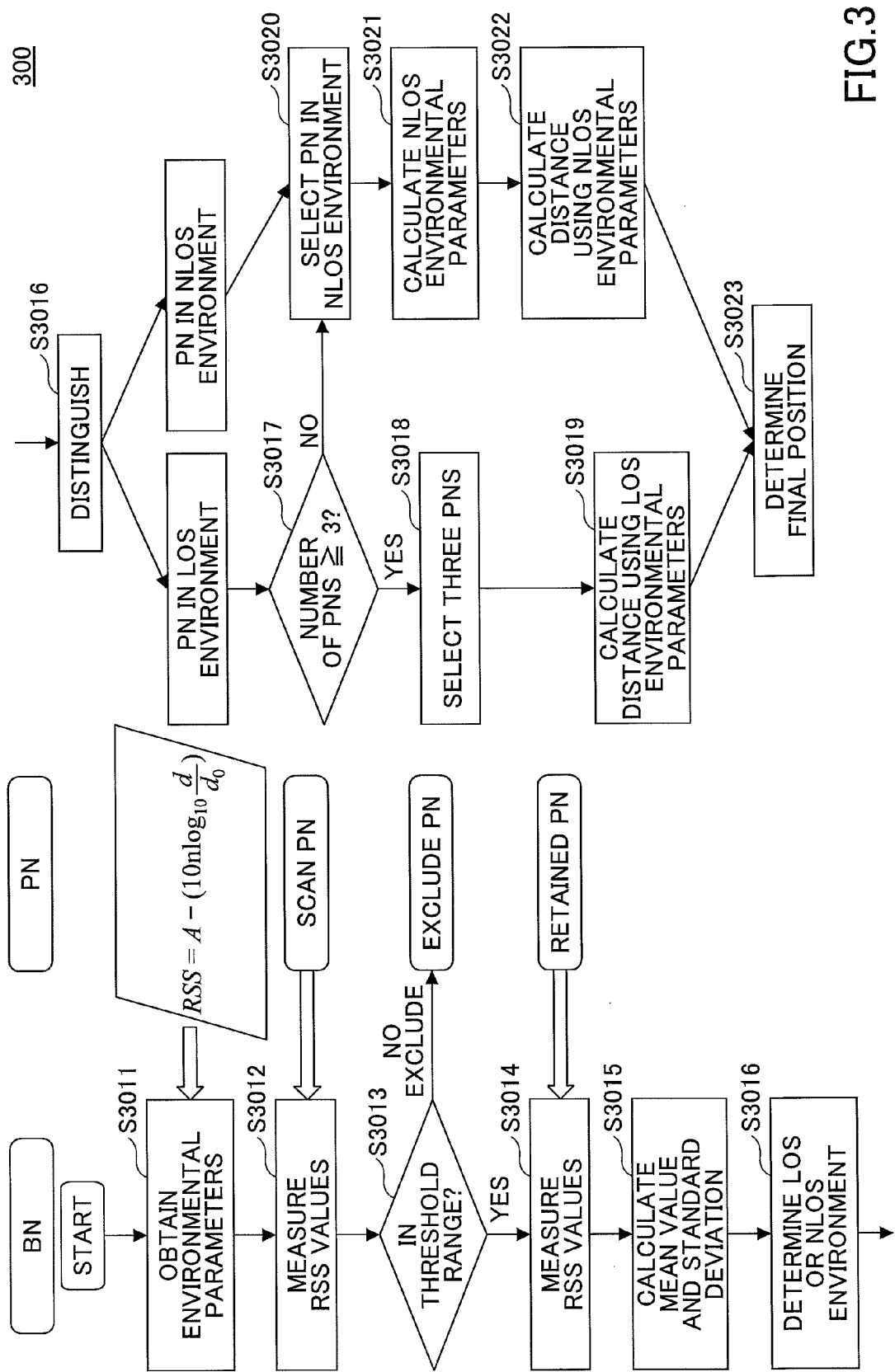
FIG. 3 is a flowchart in detail of the method shown in FIG. 2.

FIG. 3 is a flowchart 300 in detail of the method 200 shown in FIG. 2.

As shown in FIG. 3, in STEP S3011, environmental parameters in a LOS environment are obtained periodically.

Here it should be noted that, by utilizing the following path loss model (1), it is possible to obtain the environmental parameters in the LOS environment on the basis of reference nodes whose positions have been known.

$$RSS = A - \left(10n\log_{10}\frac{d}{d_0}\right) \quad (1)$$

Figure 4A:
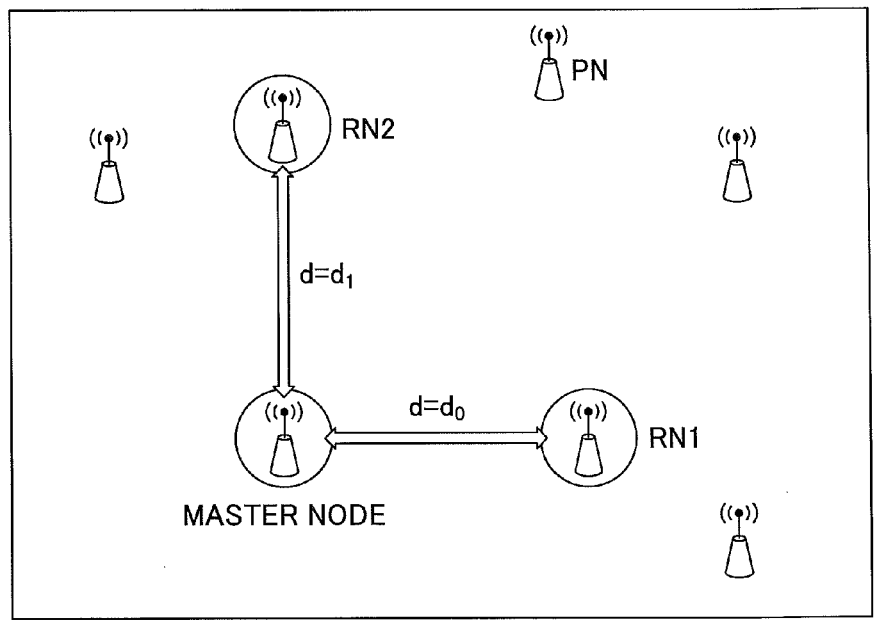
FIG. 4A illustrates a scenario in which environmental parameters in a LOS environment are obtained.

Here RSS refers to a received signal strength (RSS) value in a first reference node (for example, a reference node RN2 shown in FIG. 4A); A refers to a reference RSS value at a second reference node (for example, a reference node RN1 shown in FIG. 4A) to which the distance from a third reference node (for example, a master node shown in FIG. 4A) is $d_0$; n refers to a path loss coefficient; and d refers to the distance between the first reference node and the third reference node. Here it should be noted that A and n are the environmental parameters, and how to utilize the path loss model to concretely calculate the environmental parameters A and n will be described below.

In STEP S3012, all positioned nodes in the wireless environment are scanned (obtained), and a blind node obtains RSS values on the basis of radio signals sent, three times, from each positioned node.

In STEP S3013, for each positioned node, it is determined whether the mean value of the RSS values corresponding to this positioned node is within a predetermined threshold range; if not, then this positioned node is excluded.

In STEP S3014, the blind node measures the RSS values on the basis of radio signals sent, plural times, from each retained positioned node. Hereinafter, for the sake of convenience, a retained positioned node is also described as a positioned node.

In STEP S3015, the mean value and the standard deviation of the RSS values related to each positioned node are calculated. Here it should be noted that it is possible to let this kind of standard deviation serve as the amount of RSS jitter related to the corresponding positioned node.

Here it should be noted that in general, the amount of RSS jitter in a LOS environment is less than the amount of RSS jitter in a NLOS environment. The reason is that in the NLOS environment, there are some obstacles, and radio signals need to pass through these kinds of obstacles or to conduct multi-path transmission.

As a result, in STEP S3016, it may be determined, on the basis of this kind of relationship of the amounts of RSS jitter in the LOS and NLOS environments, whether the environment between each positioned node and the blind node is the LOS or NLOS environment.

After that, it is possible to calculate, on the basis of the determination result of STEP S3016, the distance between each positioned node and the blind node.

For example, in STEP S3017, it is possible to determine whether the number of the positioned nodes in the LOS environment is greater than or equal to three.

If the determination result of STEP S2017 is that the number of the positioned nodes in the LOS environment is greater than or equal to three, then in STEP S3018, it is possible to select three positioned nodes in the LOS environment for positioning the blind node.

Then, in STEP S3019, by utilizing the environmental parameters in the LOS environment obtained in STEP S3011, it is possible to calculate the distance between each of the selected positioned nodes in the LOS environment and the blind node as will be described below.

If the determination result of STEP S3017 is that the number of the positioned nodes in the LOS environment is less than three, that means the number of the positioned nodes in the LOS environment is not enough to position the blind node when the trilateration based positioning approach is adopted. In this case, in order to be able to position the blind node, in STEP S3020, it is necessary to additionally select one or more positioned nodes in the NLOS environment so as to let the number of the finally selected positioned nodes (regardless of being in the LOS or NLOS environment) be three.

In STEP S3021, regarding each of the additionally selected positioned node, its related environmental parameters in the NLOS environment is calculated as will be described below.

Then, in STEP S3022, the distance between each of the additionally selected positioned node and the blind node is calculated by utilizing the corresponding environmental parameters in the NLOS environment.

Here it should be noted that regarding the finally selected positioned node(s) in the LOS environment, the distance between this selected positioned node(s) and the blind node is calculated on the basis of the environmental parameters in the LOS environment obtained in STEP S3011.

After that, in STEP S3023, the position of the blind node is determined on the basis of the distance between each of the finally selected positioned nodes and the blind node as well as the position of each of the finally selected positioned nodes, as will be described below.

FIG. 4A illustrates a scenario in which environmental parameters in a LOS environment are obtained.

Figure 4B:
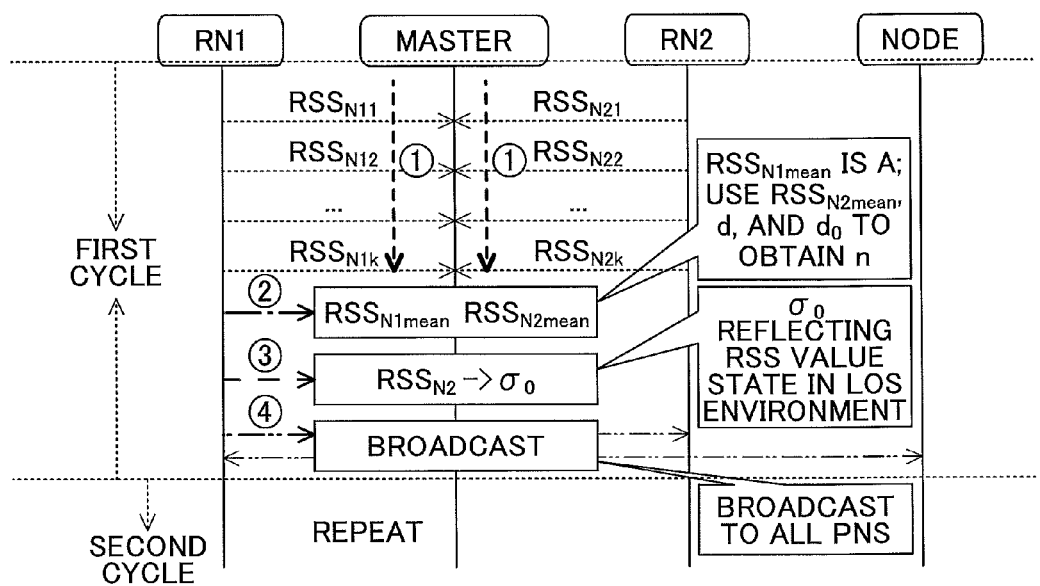
FIG. 4B illustrates signal transmission-conducted in the scenario shown in FIG. 4A.

FIG. 4B illustrates signal transmission conducted in the scenario shown in FIG. 4A.

In FIG. 4A, two pairs of reference nodes, whose positions have been known and which are in a LOS environment, are selected. Here it should be noted that the reference nodes may be those which have been in the wireless environment, or may be those which are additionally set in the wireless environment. For example, in FIG. 4A, a master node and two reference nodes RN1 and RN2 make up two pairs of reference nodes, respectively. Since the positions of the master node and the two reference nodes RN1 and RN2 have been known, it is possible to obtain the distance between the master node and each of the two reference nodes RN1 and RN2. For instance, the distance between the master node and the reference node RN1 is $d_0$, and the distance between the master node and the reference node RN2 is $d_1$.

In general, in a wireless environment, the strength of radio signals transmitted from a transmitter to a receiver decreases as the distance between the two increases. The following equation (2) is a conventional path selection model.

$$PL = PL_0 - 10n\log_{10}\frac{d}{d_0} + X_g \qquad (2)$$

Here $PL_0$ refers to a received signal power, i.e., the RSS value at a position to which the distance from the transmitter is a short one $d_0$ (for example, one meter); n refers to a path loss coefficient which changes according to a wireless environment; d refers to the distance between the transmitter and the receiver; and $X_g$ refers to a Gaussian random variable.

For example, in an indoor WLAN environment, the equation (2) may be simplified as the following path loss model (3).

$$RSS = A - \left(10n\log_{10}\frac{d}{d_0}\right) \qquad (3)$$

Here it should be noted that the path loss model (3) is the same as the path loss model (1). In addition, since the concept of the received signal strength is well known to those people skilled in the art, its related description in detail is omitted here.

Thus, on the basis of the path loss model (3), it is possible to obtain the following equation (4) for calculating the distance d.

$$d = 10^{\left(\frac{A-RSS}{10n}\right)} \qquad (4)$$

That is to say, according to the equation (4), if the environmental parameters A and n have been given, then it is possible to calculate, by utilizing the RSS value measured by a receiver, the distance d between the receiver and the corresponding transmitter.

Furthermore, in order to obtain the environmental parameters A and n, it is possible to select the master node and the reference nodes RN1 and RN2 as shown in FIG. 4A. In an example, the environmental parameter A refers to a reference RSS value in the reference node RN1 to which the distance from the master node is $d_0$, and $d_0$ is set to one meter, for instance. In this case, by letting the master node send radio signals to the reference node RN1 to which the distance from the master node is $d_0$ (as shown by ① in FIG. 4B), the reference node RN1 may receive the radio signals so as to obtain the corresponding RSS values, and may obtain the value of the environmental parameter A on the basis of the obtained corresponding RSS values (as shown by ② in FIG. 4B). For example, it is possible to let the mean value of the obtained corresponding RSS values be the value of the environmental parameter A. Moreover, by letting the master node send radio signals to the reference node RN2 to which the distance from the master node is $d_1$, the reference node RN2 may receive the radio signals so as to obtain the corresponding RSS values, and may obtain the value of RSS in the equation (4) on the basis of the obtained corresponding RSS values. For example, it is possible to let the mean value of the obtained corresponding RSS values be the value of RSS in the equation (4). After that, it is possible to calculate the path loss coefficient n by utilizing the equation (4) because the value of the environmental parameter A, the value of RSS, and the value of d (i.e., $d_1$) thereof have been known. In addition, in order to simulate a more real LOS environment, $d_1$ may be set to three to eight meters. The reason is that according to experiments and experiences, signal transmission in a LOS environment within a range of three to eight meters is relatively stable.

Therefore, in this way, it is possible to acquire the environmental parameters A and n in the LOS environment.

In addition, it is also possible to acquire the amount of RSS jitter in the LOS environment (for example, the standard deviation $\sigma_0$ of the corresponding RSS values obtained by the reference node RN2) for conducting environment determination in the follow-on step, as shown by ③ in FIG. 4B.

After that, optionally, the acquired environmental parameters A and n as well as the acquired standard deviation $\sigma_0$ are broadcasted to all positioned nodes and all probable blind nodes in the wireless environment, as shown by ④ in FIG. 4B.

In an example, it is possible to periodically acquire and broadcast the environmental parameters A and n as well as the standard deviation $\sigma_0$, so as to more accurately obtain their values in real time.

Figure 5A:
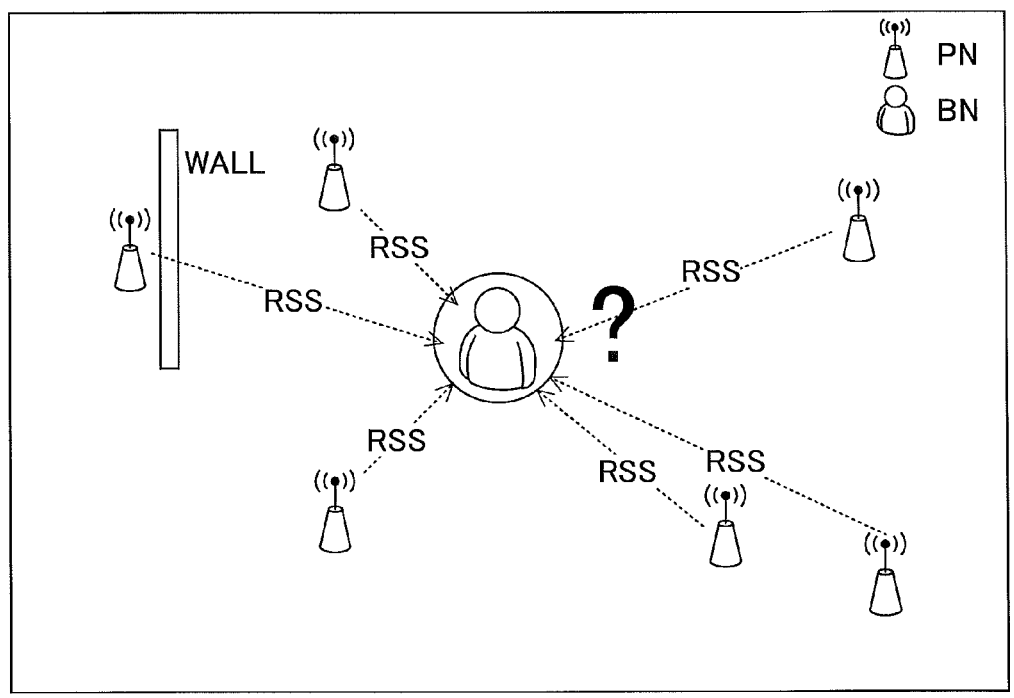
FIG. 5A illustrates a scenario in which RSS values are measured and processed.

FIG. 5A illustrates a scenario in which RSS values are measured and processed.

Figures 5B, 5C:
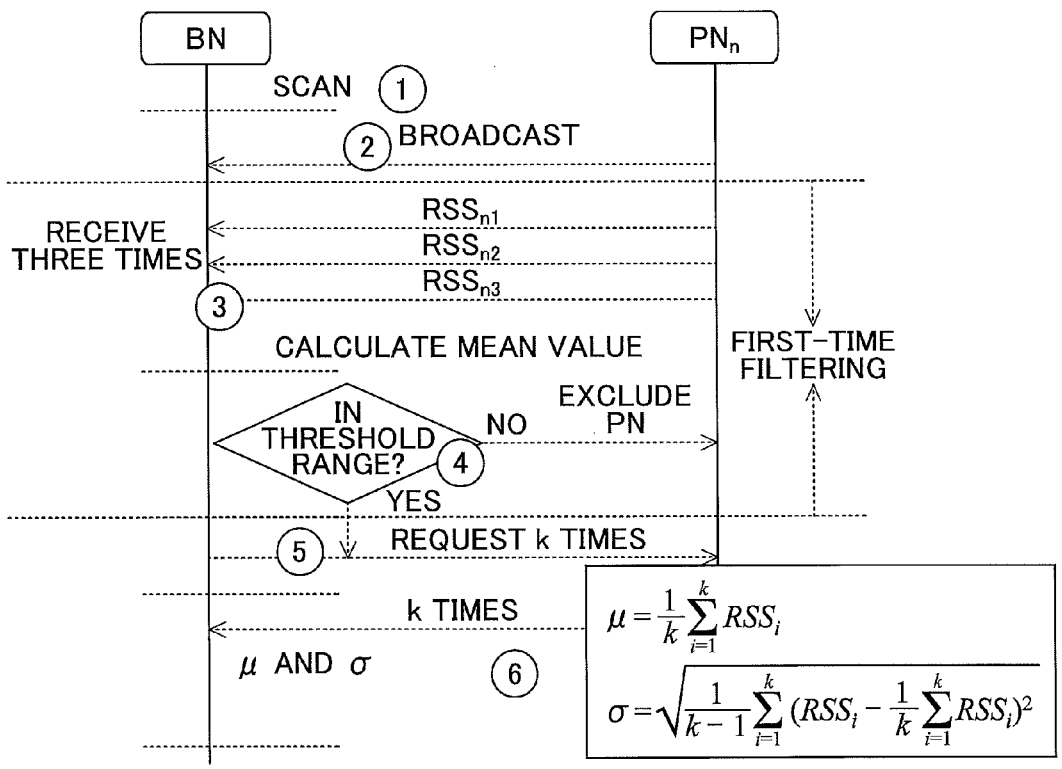
FIG. 5B illustrates signal transmission conducted in the scenario shown in FIG. 5A.
FIG. 5C illustrates a table in which RSS values as well as their mean values and standard deviations corresponding to each positioned node are included.

FIG. 5B illustrates signal transmission conducted in the scenario shown in FIG. 5A.

FIG. 5C illustrates a table in which RSS values as well as their mean values and standard deviations corresponding to each positioned node are included.

As shown in FIG. 5A, in this case, it is necessary to obtain the distances between a blind node and each positioned node, so as to determine the position of the blind node.

First the blind node measures RSS values on the basis of radio signals send by each positioned node.

In particular, the blind node scans each positioned node existing in the wireless environment, as shown by ① in FIG. 5B.

At this time, the blind node may also receive the environmental parameters A and n as well as the standard deviation $\sigma_0$ broadcasted above, as shown by ② in FIG. 5B.

After that, in order to exclude a positioned node which may be, for example, far away, severely interfered, or in a very bad environment, so as to avoid the influence due to this kind of positioned node, each positioned node sends radio signals to the blind node three times, as shown by ③ in FIG. 5B. In this way, the blind node may obtain RSS values three times, and may calculate the mean value of the RSS values related to each positioned node.

Then, as shown by ④ in FIG. 5B, for each positioned node, it is determined whether the mean value related to the corresponding positioned node is within a predetermined threshold range (x dB, y dB); if not, then the corresponding positioned node is excluded. For example, the predetermined threshold range (x dB, y dB) may be set on the basis of a distance range of three to eight meters. In this way, it is possible to exclude a positioned node which is not in the distance range of three to eight meters, so as to guarantee the stability of wireless transmission between the blind node and each retained positioned node. Of courses, this kind of predetermined threshold range is just an example. It is also possible to adjust the predetermined threshold range according to an actual wireless environment and an expected number of positioned nodes. Here it should be noted that this kind of exclusion may be regarded as a first-time filtering.

After that, as shown by ⑤ in FIG. 5B, each positioned node (i.e., each retained positioned node) sends, k times (k>1), radio signals to the blind node.

At the same time, regarding each positioned node, the blind node may measure, k times, RSS values related to the corresponding node, so as to calculate a mean value μ and a standard deviation σ on the basis of the RSS values by utilizing the following equation (5), as shown by ⑥ in FIG. 5B.

$$\mu = \frac{1}{k}\sum_{i=1}^{k} RSS_i \qquad (5)$$

$$\sigma = \sqrt{\frac{1}{k-1}\sum_{i=1}^{k}\left(RSS_i - \frac{1}{k}\sum_{i=1}^{k} RSS_i\right)^2}$$

Here, if the blind node has not yet received radio signals sent from a positioned node after a predetermined time period, it is also possible to set the RSS value related to this positioned node to zero.

In this way, it is possible to, for each positioned node, obtain its related mean value and standard deviation of RSS values measured on the basis of radio signals sent from the corresponding positioned node to the blind node, so as to make up a table as shown in FIG. 5C.

Figure 6A:
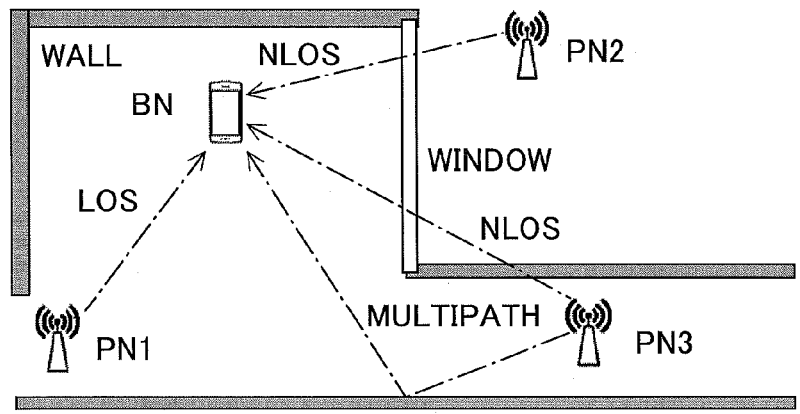
FIG. 6A illustrates a scenario in which LOS and NLOS propagation environments are included.

FIG. 6A illustrates a scenario in which LOS and NLOS propagation environments are included.

For example, as shown in FIG. 6A, the environment between a blind node BN (for example, a cellular phone shown in FIG. 6A) and a positioned node PN1 is a LOS environment. The environment between the blind node BN and a positioned node PN2 is a NLOS environment because there is an obstacle (i.e., the window) between the two. In addition, the environment between the blind node BN and a positioned node PN3 is a NLOS environment, and is a multipath environment. Here it should be noted that in the present specification, a multipath environment is also regarded as a NLOS environment.

Since it is found by the inventors that environmental parameters in LOS and NLOS environments are different, by utilizing the amounts of RSS jitter (for example, the standard deviations of RSS values) in the LOS and NLOS environments, it is possible to distinguish the LOS and NLOS environments.

Figure 6B:
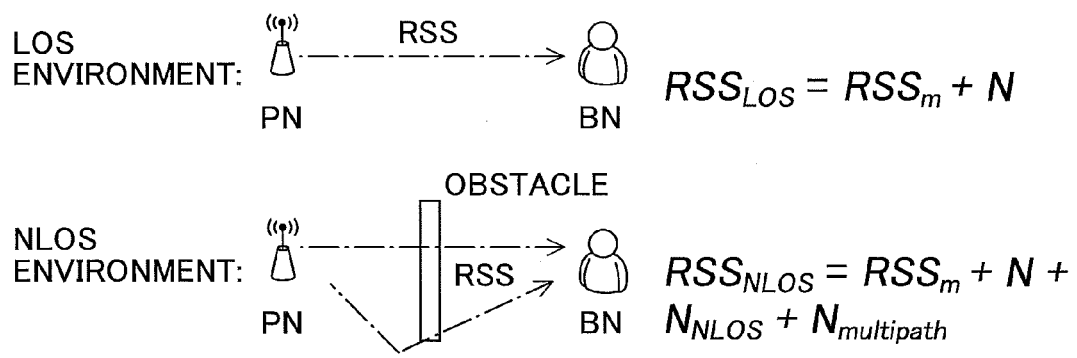
FIG. 6B illustrates how to determine LOS and NLOS propagation environments.

FIG. 6B illustrates how to determine LOS and NLOS propagation environments.

As shown in FIG. 6B, in a LOS environment, a RSS value $RSS_{LOS}$ obtained by a blind node on the basis of radio signals sent from a positioned node includes a measured RSS value $RSS_m$ and a measured noise value N which is according to normal distribution, as expressed by the following equation (6).

$$RSS_{LOS} = RSS_m + N \qquad (6)$$

Furthermore, in a NLOS environment, a RSS value $RSS_{NLOS}$ obtained by a blind node on the basis of radio signals sent from a positioned node include a measured RSS value $RSS_m$, a measured noise value N which is according to normal distribution, a NLOS environmental noise value $N_{NLOS}$ (due to, for example, passing through an obstacle), and a multipath noise value $N_{multipath}$ (due to, for example, reflection and diffuse reflection), as expressed by the following the equation (7).

$$RSS_{NLOS}=RSS_m+N+N_{NLOS}+N_{multipath} \quad (7)$$

Compared to the amount of RSS jitter in the LOS environment, the amount of RSS jitter in the NLOS environment is much greater. As a result, the standard deviation of RSS values in the NLOS environment is much greater than that in the LOS environment, i.e., $\sigma_{NLOS} \gg \sigma_0$. Here $\sigma_0$ refers to the standard deviation of RSS values in the LOS environment obtained above.

For example, it is possible to adopt the following equation (8) to determine that a propagation environment is a LOS or NLOS environment.

$$\begin{cases} \sigma < k\sigma_0 & LOS \text{ enviromnent} \\ \sigma \geq k\sigma_0 & NLOS \text{ environment} \end{cases} \quad (8)$$

Here k is a constant greater than 1, and actually, k is set to 1.5. However, if the number of positioned nodes is less, and the corresponding wireless environment is bad, then it is also possible to set k to a larger value. That is to say, by increasing the value of k, it is possible to let more positioned nodes be determined as in a LOS environment.

As a result, by utilizing the standard deviation $\sigma$ related to each positioned node in the table shown FIG. 5C and the standard deviation $\sigma_0$ in the LOS environment obtained above, it is possible to determine, according to the above equation (8), whether the environment between a blind node and each positioned node is the LOS or NLOS environment.

In an example, considering that the propagation environment between a blind node and a positioned node may change, it is also possible to, after a predetermined time period or in a case where the blind node moves, reconduct the steps shown in FIG. 5B and the determination step on the basis of the above equation (8), so as to obtain a more accurate and real-time determination result.

Therefore, when calculating the distance between a blind node and a positioned node in difference propagation environments, for example, in a case of a LOS environment, it is possible to calculate the distance on the basis of the environmental parameters A and n in the LOS environment obtained above as well the path loss model, and in a case of a NLOS environment, it is possible to obtain environmental parameters A and n in the NLOS environment as will be describe below, and to calculated the distance on the basis of the obtained environmental parameters A and n in the NLOS environment as well as the path loss model.

Figure 7A:
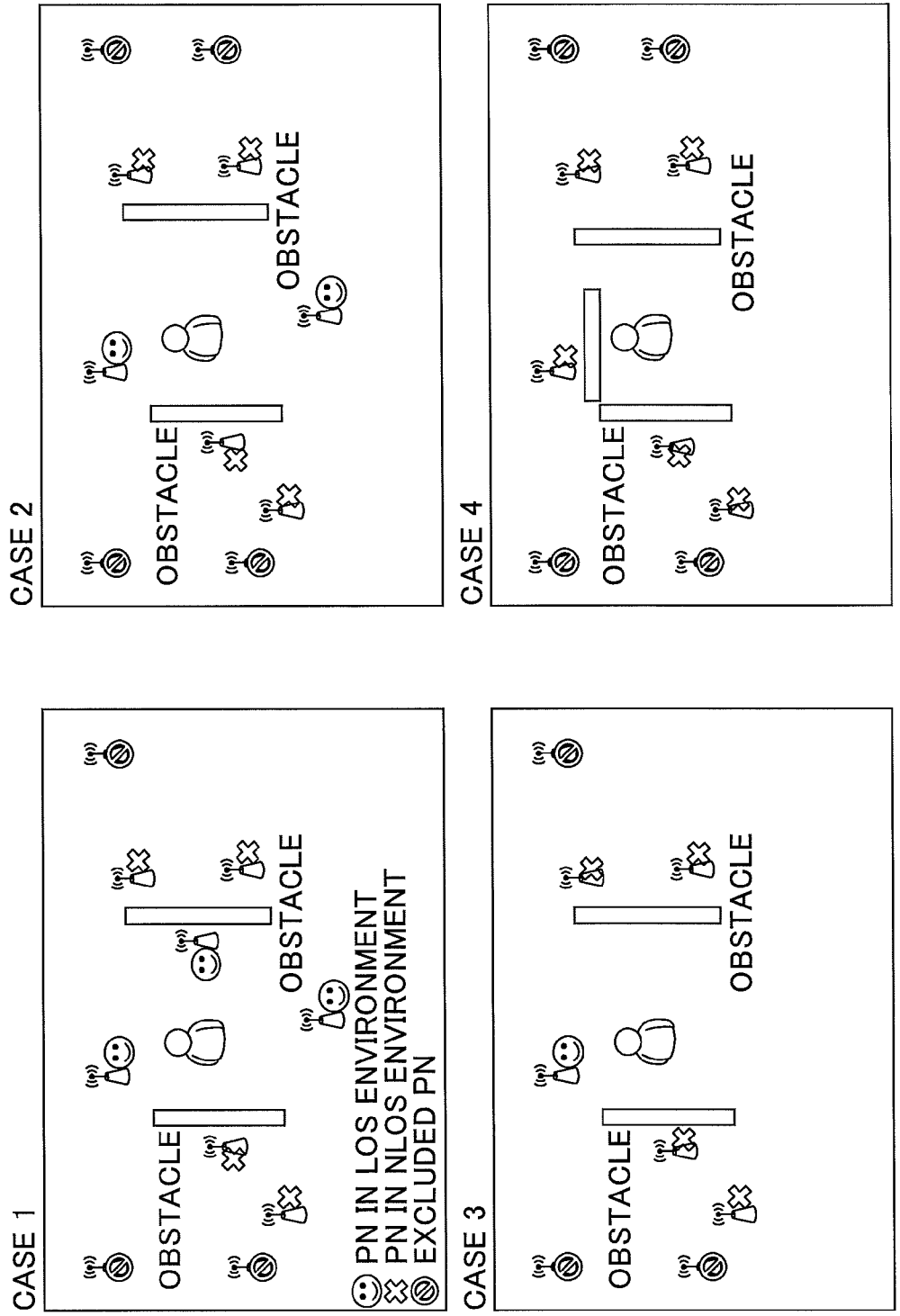
FIG. 7A illustrates four probable cases after determining LOS and NLOS propagation environments.

FIG. 7A illustrates four probable cases after determining LOA and NLOS propagation environments.

As described above, if the position of a blind node in the wireless environment needs to be positioned, then it is possible to calculate the distance between the blind node and each of three positioned nodes, so as to determine the position of the blind node by utilizing the trilateration based positioning approach.

As shown in FIG. 7A, after determining whether the environment between a blind node and each positioned node is the LOS or NLOS environment, there are four probable cases 1 to 4 as follows.

Case 1: the number of the positioned nodes in the LOS environment is greater than or equal to three.

Case 2: the number of the positioned nodes in the LOS environment is two, and the other positioned nodes are in the NLOS environment.

Case 3: only one positioned node is in the LOS environment, and the other positioned nodes are in the NLOS environment.

Case 4: there isn't a positioned node in the LOS environment; that is to say, all the positioned nodes are in the NLOS environment.

Figure 7B:
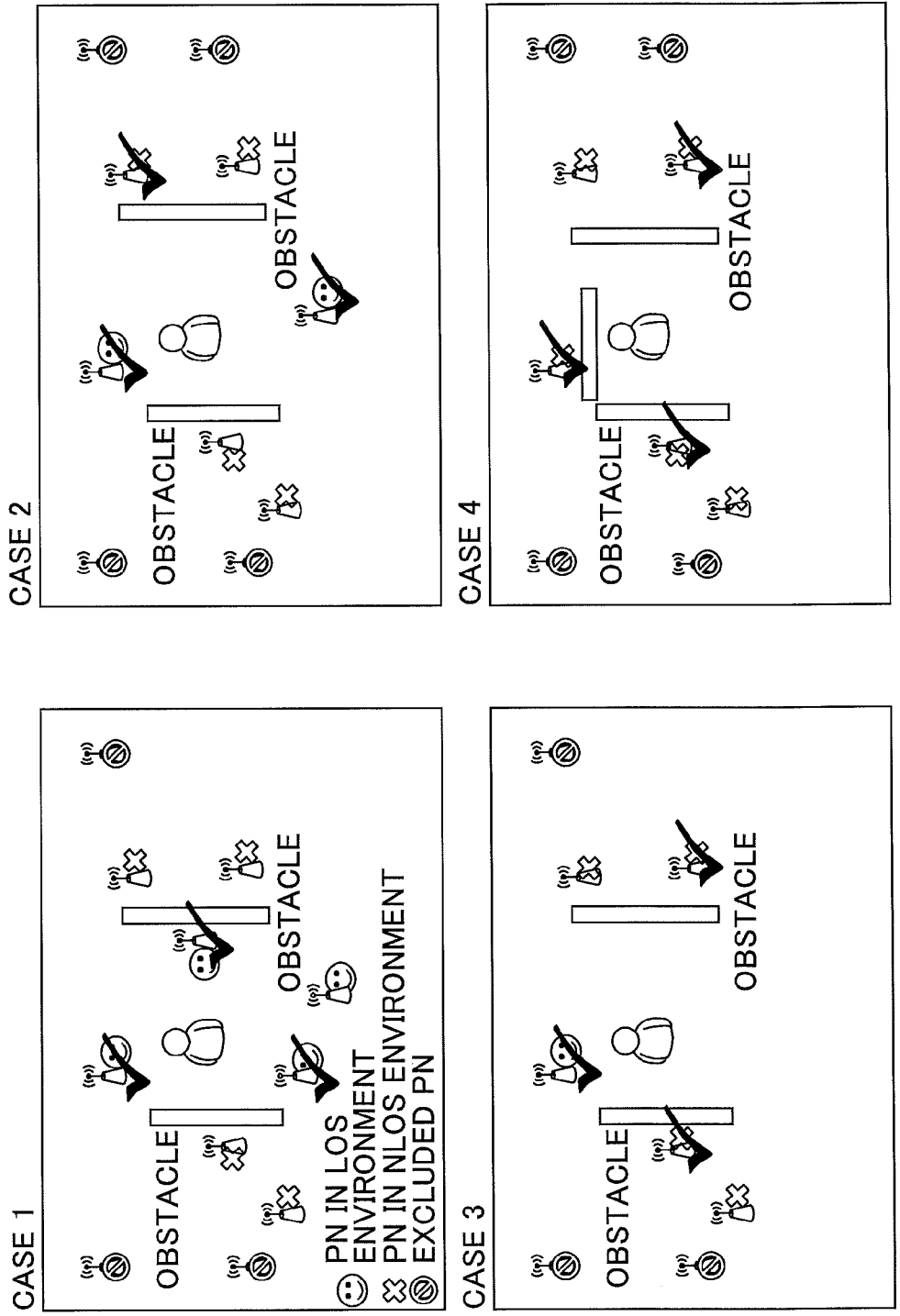
FIG. 7B illustrates how to select three positioned nodes for positioning a blind node in each case shown in FIG. 7A.

FIG. 7B illustrates how to select three positioned nodes for positioning a blind node in each case shown in FIG. 7A.

Figure 8A:
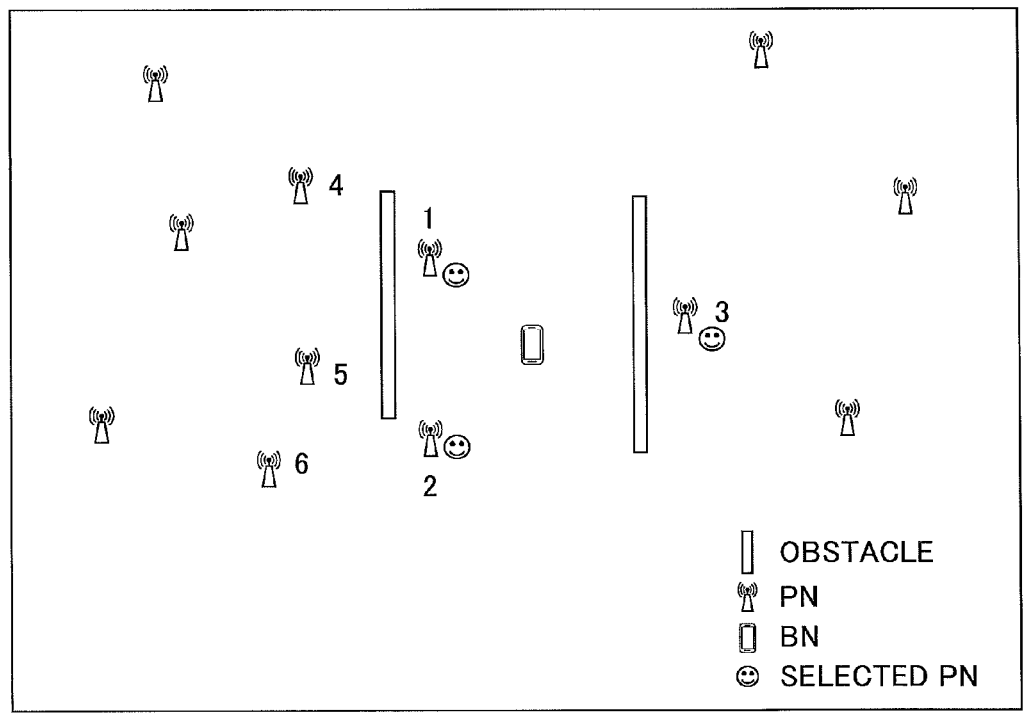
FIG. 8A illustrates a scenario in which the distance between a positioned node and a blind node which are in a NLOS environment is calculated.
Figure 8B:
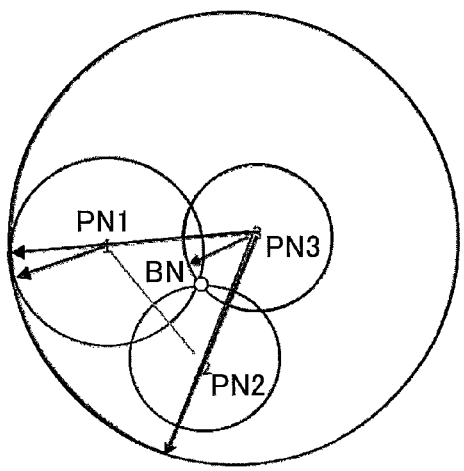
FIG. 8B illustrates how to add positioned nodes when calculating environmental parameters in a NLOS propagation environment.

As shown in FIG. 8B, regarding Case 1, since the number of the positioned nodes in the LOS environment is greater than or equal to three, it is possible to select three positioned nodes which may make up an acute triangle covering (including) the blind node.

Regarding Case 2, since the number of the positioned nodes in the LOS environment is two, it is necessary to select a positioned node in the NOLS environment so as to make up, together with the two positioned nodes, an acute triangle including the blind node.

Regarding Case 3, since there is only one positioned node in the LOS environment, it is necessary to select two positioned nodes in the NLOS environment so as to make up, together with the one positioned node, an acute triangle including the blind node.

Regarding Case 4, since there isn't a positioned node in the LOS environment, it is necessary to select three positioned nodes in the NLOS environment so as to make up an acute triangle including the blind node.

Here it should be noted that when selecting the positioned node(s) so as to make up an acute triangle, it is necessary to consider that it is possible to make up an acute triangle and the RSS value(s) related to selected positioned node(s) should be as large as possible. For example, regarding Case 4, it is possible to select a first positioned node whose related RSS value is largest, then to select a second positioned node whose related RSS value is second largest, and then to select another positioned node with which the first and second positioned nodes can make up an acute triangle including the blind node. If the first and second positioned nodes cannot make up an acute triangle together with another positioned node, then it is possible to select a third positioned node whose related RSS value is third largest, and then to select another positioned node so as to make up, by the first and third positioned nodes and the other positioned node, an acute triangle including the blind node. In addition, the present invention is not limited to this; that is to say, those people skilled in the art may also adopt any other approach to select one or more positioned nodes for making up an acute triangle including the blind node.

FIG. 7C illustrates the principle of the selection shown in FIG. 7B.

As shown in FIG. 7C, three positioned nodes are arranged in four ways. Namely, they are arranged so as to make up a straight line, a right triangle, an obtuse triangle, and an acute triangle. Among these, the way that the three positioned nodes are arranged so as to make up the acute triangle is preferable. The reason is that as described above, the trilateration based positioning approach will be adopted below for positioning the position of a blind node. In this case, since the mass center of an overlap area of three circles, whose centers are the positions of the three positioned nodes and whose radii are the distances between the three positioned nodes and the blind node, will be determined as the position of the blind node, if the way that the three positioned nodes are arranged so as to make up an acute triangle, then the overlap area may be relatively small so as to be capable of obtaining a more accurate position of the blind node. However, it should be noted that the present invention is not limited to this.

Up to here, it has been described how a LOS or NLOS environment is determined and how three positioned nodes for positioning a blind node are selected. In what follows, it will be described how the distances between a blind node and three positioned nodes are calculated on the basis of different propagation environments.

Here, refer to FIG. 3 again; in STEP S3016, as described above, regarding each positioned node, it is possible to distinguish a LOS environment from a NLOS environment on the basis of the difference of the standard deviations of the RSS values related to the corresponding positioned node in the LOS and NLOS environments.

In STEP S3017, it is determined whether the number of the positioned nodes in the LOS environment is greater than or equal to three.

If it is determined that the number of the positioned nodes in the LOS environment is greater than or equal to three, then in STEP S3018, three positioned nodes in the LOS environment are selected. Here it should be noted that when conducting this selection, it is possible to consider the RSS values measured by the blind node. For example, it is possible to select only positioned nodes whose related RSS values are within a predetermined threshold range of (x dB, y dB). In an instance, the predetermined threshold range is (−35 dB, −80 dB) in a case where the distance between a blind node and a positioned node is within three to eight meters. Of course, the present invention is not limited to this; that is to say, it is also possible to let the predetermine threshold range be wider, according to actual needs.

In STEP S3019, it is possible to use the environmental parameters A and n obtained above, the path loss model, and three RSS values measured by the blind node on the basis of radio signals sent by the three positioned nodes, so as to calculate the distance between the blind node and each of the three positioned nodes.

On the other hand, if it is determined, in STEP S2017, that the number of positioned nodes in the LOS environment is less than three, then in STEP S3020, as described above, it is possible to additionally select one or more positioned nodes in the NLOS environment, so as to make up an acute triangle.

Here it should be noted that if it is impossible to make up the acute triangle, then it is also possible to additionally select a few positioned nodes whose related RSS value are relatively large, so as to make up the acute triangle. In this way, it is possible to additionally select those positioned nodes which are as near as possible to the blind node, so as to be able to reduce the instability due to long-distance transmission of radio signals.

In addition, when additionally selecting the one or more positioned nodes in the NLOS environment, it is also possible to additionally select only those positioned nodes whose related RSS values are within the predetermined threshold range (x dB, y dB).

After that, in STEP S3021, regarding each of the additionally selected positioned nodes in the NLOS environment, it is possible to calculate its related environmental parameters in the NLOS environment as will be described below.

In STEP S3022, it is possible to use the calculated environmental parameters of each of the additionally selected positioned nodes in the NLOS environment, the path loss model, and the RSS value measured by the blind node on the basis of radio signals sent from this additionally selected positioned node in the NLOS environment, so as to calculate the distance between the blind node and this additionally selected positioned node.

Here it should be noted that regarding the selected positioned node(s) in the LOS environment, the distance between this selected positioned node(s) and the blind node is calculated on the environmental parameters in the LOS environment obtained above.

Finally, in STEP S3022, by utilizing the trilateration based positioning approach, it is possible to determine, on the basis of the distance between each of the finally selected positioned nodes and the blind node, the position of the blind node.

In what follows, it will be concretely described how the environmental parameters of a positioned node in a NLOS environment are calculated.

FIG. 8A illustrates a scenario in which the distance between a positioned node and a blind node which are in a NLOS environment is calculated.

As shown in FIG. 8A, it is assumed that positioned nodes PN1 and PN2 are in a LOS environment together with a blind node BN, and a positioned node PN3 is in a NLOS environment together with the blind node BN. In order to calculate the environmental parameters in the NLOS environment between the positioned node PN3 and the blind node BN, it is necessary to select other positioned nodes to serve as additional positioned nodes. Here it should be noted that the environment between each of the additional positioned node and the blind node BN should be as similar as possible to that between the positioned node PN3 and the blind node BN.

FIG. 8B illustrates how to add positioned nodes when calculating environmental parameters in a NLOS propagation environment.

First, the distance between the positioned nodes PN1 and PN3 as well as the distance between the positioned nodes PN2 and PN3 are calculated, respectively. Here it should be noted that since the positioned nodes PN1 and PN2 are in the LOS environment together with the blind node BN, the distance between the blind node BN and the positioned node PN1 or PN2 may be calculated as described above.

Second, as shown in FIG. 8B, a first circle is generated whose center is the positioned node PN3 and whose radius is the sum of the distance between the positioned nodes PN3 and PN1 and the distance between the positioned node PN1 and the blind node BN. A second circle is generated whose center is the positioned node PN3 and whose radius is the sum of the distance between the positioned nodes PN2 and PN3 and the distance between the positioned node PN2 and the blind node BN. And then, additional positioned nodes are found in an area formed by the first and second circles, the straight line passing through the positioned nodes PN1 and PN3, and the straight line passing through the positioned nodes PN3 and PN2. For example, as shown in FIG. 8A, positioned node PN4, PN5, and PN6 are found as the additional positioned nodes.

As a result, by utilizing the additional positioned nodes PN4, PN5, and PN6, it is possible to more accurately simulate the NLOS environment between the positioned node PN3 and the blind node BN.

After that, in order to calculate the environmental parameters in the NLOS environment, it is possible to let the positioned node PN3 send radio signals to each of the additional positioned nodes PN4, PN5, and PN6 as well as the positioned nodes PN1 and PN2, then to measure the RSS value in each of the five positioned nodes PN1, PN2, PN4, PN5, and PN6, and then to calculate, on the basis of the distance d between each of the five positioned nodes and the positioned node PN3 as well as the path loss model, one of the environmental parameters, i.e., the path loss coefficient n related to each of the five positioned nodes. Here it should be noted that regarding the value of another environmental parameter A, it is the same as above, and the value of $d_0$ is about one meter. And then, it is possible to calculate an average value of the five path loss coefficients n, and to let the calculated average value serve as the environmental parameter $n_{NLOS}$ in the NLOS environment.

Finally, by utilizing the environmental parameter $n_{NLOS}$ in the NLOS environment, the RSS value measured in the blind node BN on the basis of the signals sent by the positioned node PN3, and the path loss model, it is possible to calculate the distance between the blind node BN and the positioned node PN3 which are in the NLOS environment.

Here it should be noted that regarding the other positioned nodes in the NLOS environment, by using a similar way, it is also possible to calculate the distance between the blind node and each of the other positioned nodes in the NLOS environment.

Therefore, in this way, it is possible to calculate the distance between the blind node BN and each of the three positioned nodes PN1, PN2, and PN3 (regardless of being in a LOS or NLOS environment).

Figure 9:
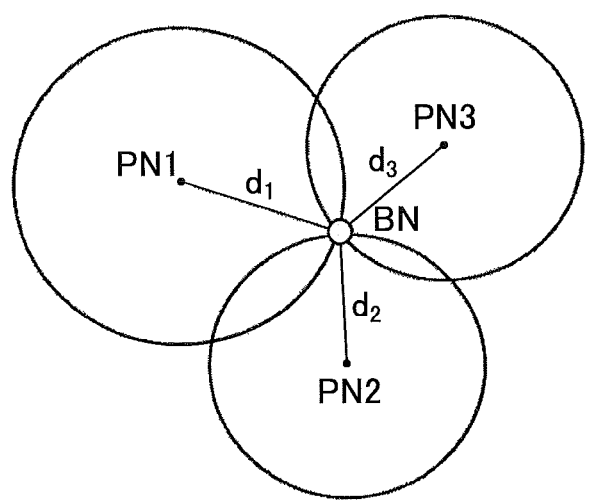
FIG. 9 illustrates how to estimate the position of a blind node by utilizing a trilateration based positioning approach.

FIG. 9 illustrates how to estimate the position of a blind node by utilizing a trilateration based positioning approach.

As shown in FIG. 9, it is supposed that the distances d1, d2, and d3 between a blind node BN and three positioned nodes PN1, PN2, and PN3 have been known. In this case, it is possible to respectively generate three circles whose centers are the positions of the positioned nodes PN1, PN2, and PN3 and whose radius are the distances d1, d2, and d3, and to determine a point in an overlap area of the three circles as the position of the blind node BN. In general, it is possible to let the mass center of the overlap area serve as the position of the blind node BN. However, this is just an example; that is to say, it is also possible to let another point in the overlap area serve as the position of the blind node BN. In addition, in a case where only two circles may overlap, it is also possible to let a point in the overlap area of these two circles serve as the position of the blind node, or to adopt any other reasonable positioning approach to determine the position of the blind node.

As a result, by utilizing the techniques disclosed in this embodiment, LOS and NLOS environments may be distinguished, so that different environmental parameters may be adopted according to the LOS and NLOS environments, and the distances between two nodes in the LOS and NLOS environment may be calculated more accurately. In this way, by utilizing these kinds of more accurately calculated distances, for example, it is possible to more accurately determine the position of a blind node. This may play an important role when, in a complicated wireless environment, the distance between two nodes needs to be accurately estimated, and the position of a node needs to be accurately determined.

Figure 10:
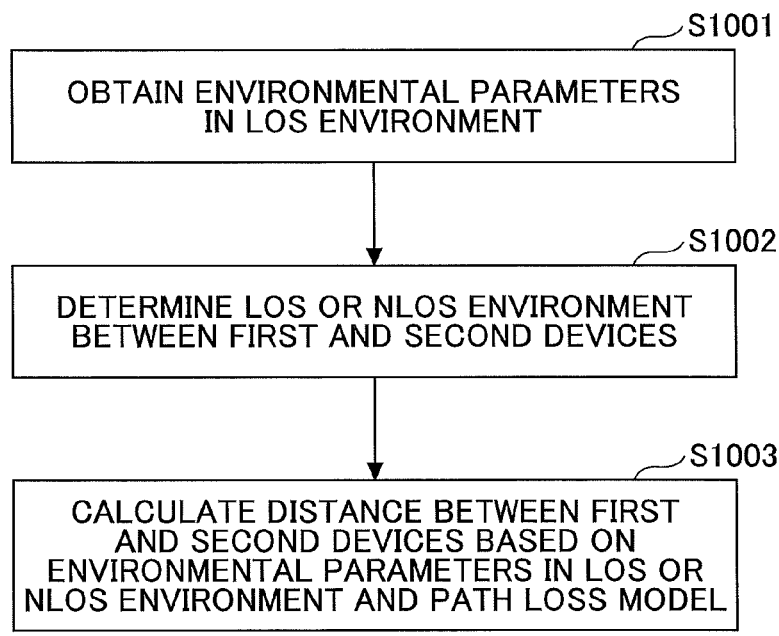
FIG. 10 is a flowchart of a method of determining the distance between two devices in a wireless environment according to an embodiment of the present invention.

FIG. 10 is a flowchart of a method 1000 of determining the distance between two devices in a wireless environment according to an embodiment of the present invention.

As shown in FIG. 10, the method 1000 includes STEPS S1001, S1002, and S1003.

In STEP S1001, environmental parameters in a LOS environment are obtained. In STEP S1002, it is determined, on the basis of the relationship between the amounts of RSS jitter in LOS and NLOS environments, whether the environment between first and second nodes is the LOS or NLOS environment. In STEP S1003, if the environment between the first and second nodes is the LOS environment, then the distance between the first and second nodes is calculated on the basis of the environmental parameters in the LOS environment and a path loss model; otherwise, environmental parameters in the NLOS environment are calculated, and the distance between the first and second nodes is calculated on the basis of the environmental parameters in the NLOS environment and the path loss model.

In an example, the relationship between the amounts of RSS jitter in the LOS and NLOS environments may include a relationship that the amount of RSS jitter in the NLOS environment is greater than or equal to k times the amount of BBS jitter in the LOS environment; here $k \geq 1$.

In an example, the calculation of the distance between the first and second nodes on the basis of the environmental parameters in the NLOS environment and the path loss model may include selecting one or more third nodes, which are in the NLOS environment together with the first node, so as to measure, in each third node, a RSS value on the basis of radio signals sent from the first node; calculating, on the basis of the path loss model and the distance between the first node and each third node, the environmental parameters in the NLOS environment; and calculating the distance of the first and second nodes on the basis of the environmental parameters in the NLOS environment, a RSS value which is measured in the second node on the basis of radio signals sent from the first node, and the path loss model.

In an example, it is possible to select the one or more third nodes so that the environments between the first node and the one or more third nodes may simulate the environment between the first node and the second node.

In an example, the path loss model may include the above-described path loss model.

In an example, the amount of RSS jitter may include the standard deviation of the corresponding RSS values.

Moreover, the method 1000 may further include selecting plural first nodes whose positions have been known; calculating the distance between each first node and a second node whose position has not been known; and estimating the position of the second node on the basis of the distance between each first node and the second node as well as the position of each first node.

In an example, the number of the first nodes may be three.

In an example, it is possible to select plural first nodes so as to make up an acute triangle by the selected first nodes, which covers (includes) the second node.

In an example, it is possible to adopt a trilateration based positioning approach to estimate the position of the second node on the base of the distance between each first node and the second node as well as the position of each first node.

Furthermore, the method 1000 may, before determining, on the basis of the relationship between the amounts of RSS jitter in the LOS and NLOS environments, whether the environment between the first and second nodes is the LOS or the NLOS environment, further include removing a first node that the RSS value measured in the second node on the basis of the radio signals sent from this first node exceeds a predetermined threshold range.

As a result, by utilizing the techniques described in this embodiment, LOS and NLOS environments may be distinguished, so that different environmental parameters may be adopted according to the LOS and NLOS environments, and the distances between two nodes in the LOS and NLOS environments may be calculated more accurately. In this way, by utilizing these kinds of more accurately calculated distances, for example, it is possible to more accurately determine the position of a blind node. This may play an important role when the distance between two nodes in a complicated wireless environment needs to be accurately estimated.

Figure 11:
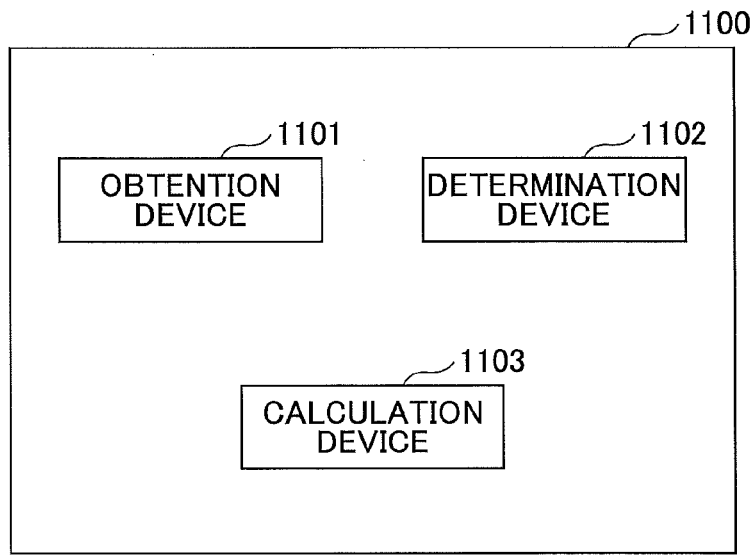
FIG. 11 illustrates a block diagram of a system for determining the distance between two devices in a wireless environment according to an embodiment of the present invention.

FIG. 11 illustrates a block diagram of a system 1100 for determining the distance between two devices in a wireless environment according to an embodiment of the present invention.

As shown in FIG. 11, the system 1100 includes an obtention device 1101, a determination device 1102, and a calculation device 1103.

The obtention device 1101 is configured to obtain environmental parameters in a LOS environment. The determination device 1102 is configured to determine, on the basis of the relationship between the amounts of RSS jitter in the LOS and NLOS environments, whether the environment between first and second nodes is the LOS or NLOS environment. The calculation device 1103 is configured to, if the environment between the first and second nodes is the LOS environment, then calculate the distance between the first and second nodes on the basis of the environmental parameters in the LOS environment as well as a path loss model, otherwise, calculate environmental parameters in the NLOS environment, and then calculate the distance between the first and second nodes on the basis of the environmental parameters in the NLOS environment as well as the path loss model.

As a result, by utilizing the techniques described in this embodiment, LOS and NLOS environments may be distinguished, so that different environmental parameters may be adopted according to the LOS and NLOS environments, and the distances between two nodes in the LOS and NLOS environments may be calculated more accurately. In this way, by utilizing these kinds of more accurately calculated distances, for example, it is possible to more accurately determine the position of a blind node. This may play an important role when the distance between two nodes in a complicated wireless environment needs to be accurately estimated.

Figure 12:
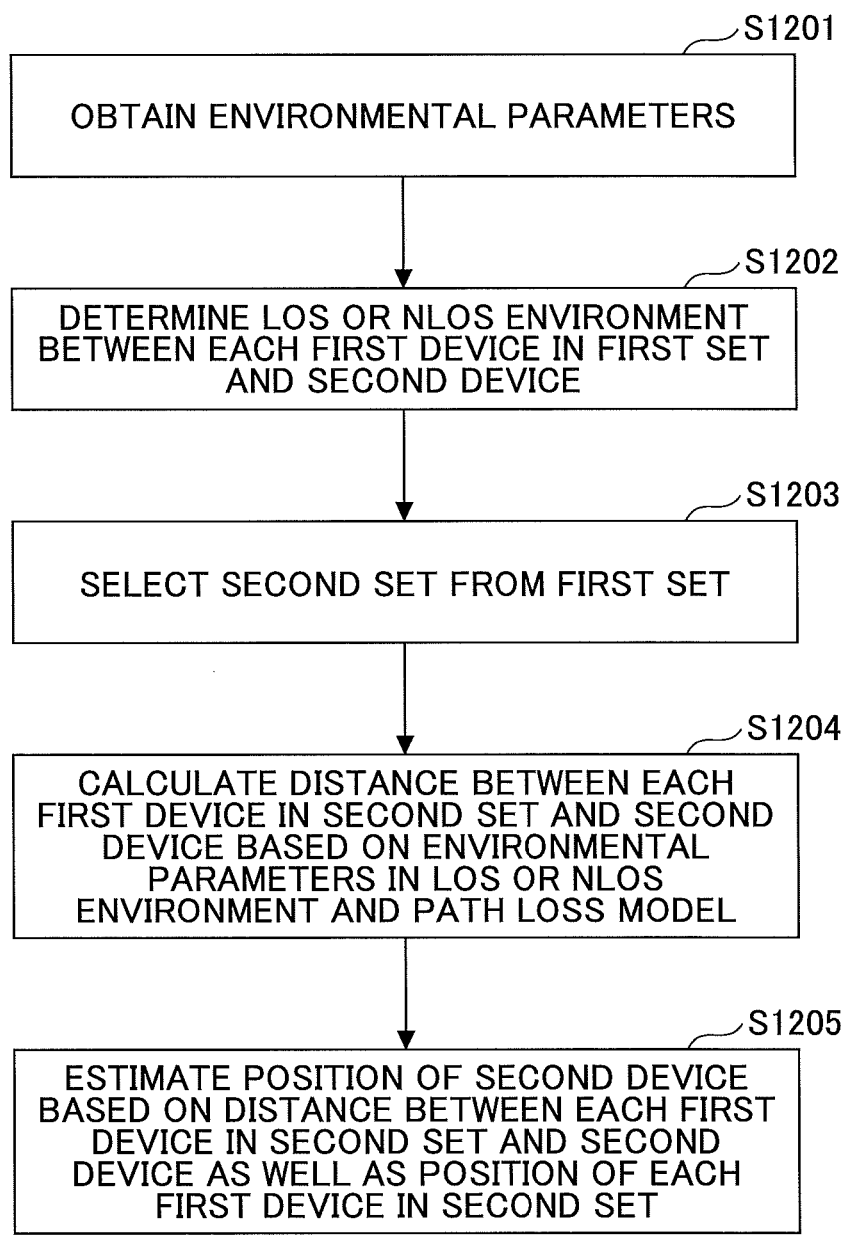
FIG. 12 is a flowchart of a method of positioning a device in a wireless environment according to an embodiment of the present invention.

FIG. 12 is a flowchart of a method 1200 of positioning a device in a wireless environment according to an embodiment of the present invention.

As shown in FIG. 12, the method 1200 includes STEPS S1201, S1202, S1203, S1204, and S1205.

In STEP S1201, environmental parameters in the wireless environment are obtained. In STEP S1202, it is determined, on the basis of the relationship between the amounts of RSS jitter in LOS and NLOS environments, whether the environment between each first node in a first set of first nodes whose positions have been known and a second node whose position needs to be positioned, is the LOS or NLOS environment. In STEP S1203, a second set is selected from the first set. In STEP S1240, the distance between each first node in the second set and the second node is calculated on the basis of the environmental parameters and a path loss model. Here, if a first node in the second set and the second node are in the LOS environment, then the environmental parameters are those in the LOS environment, and if a first node in the second set and the second node are in the NLOS environment, then the environmental parameters are those in the NLOS environment. In STEP S1205, the position of the second node is estimated on the basis of the distance between each first node in the second set and the second node as well as the position of each first node in the second set.

In an example, STEP S1201 may include obtaining two pairs of reference nodes which are in the LOS environment and whose positions have been known; measuring a RSS value in one reference node of each pair, serving as a receiver on the basis of radio signals sent from another reference node of the corresponding pair, serving as a transmitter to the corresponding receiver, and then letting one RSS value be a first reference RSS value, another RSS value be a second reference RSS value; and letting the first reference RSS value be a parameter A in a path loss model, and then calculating, on the basis of the path loss model, the distance between the two reference nodes of each pair, and the second reference RSS value, a path loss coefficient n in the path loss model. Furthermore, STEP S1201 may further include calculating a reference standard deviation $\sigma_0$ of the RSS values measured, plural times, in any one of the receivers.

In an example, STEP S1202 may include letting each first node in the first set send, plural times, radio signals to the second node; for each first node, measuring, plural times, RSS values in the second node on the basis of the radio signals sent from the corresponding first node; for each first node, calculating both a mean value $\mu$ and a standard deviation value $\sigma$ of the RSS values related to the corresponding first node; for each first node, if the related standard deviation value $\sigma$ of the corresponding first node is greater than or equal to $k*\sigma_0$, then determining the corresponding first node as a first node which is in the NLOS environment together with the second node, otherwise, determining the corresponding first node as a first node which is in the LOS environment together with the second node. Here $k \geq 1$, and $\sigma_0$ is a reference standard deviation being the same as above.

Moreover, the method 1200 may further include, before calculating the standard deviation $\sigma$, removing a first node from the first set, wherein, the mean value of the RSS values measured in the second node on the basis of the radio signals sent plural times from this first node exceeds a predetermined threshold range.

In an example, in STEP S1203, in the first set, if the number of first nodes in the LOS environment is greater than or equal to three, then it is possible select three first nodes in the LOS environment to make up the second set; if the number of first nodes in the first nodes in the LOS environment is less than three, then it is possible to additionally select one or more first nodes in NLOS environment so as to let the number of both the additionally selected first nodes in the NLOS environment and the first node(s) in the LOS environment (if it exists) be three, and to let the three make up the second set.

In an example, when selecting the first nodes in the first set to make up the second set in STEP S1203, it is possible to consider one of the following conditions. Namely, the selected three first nodes may generate an acute triangle; the related RSS values corresponding to the selected three first nodes are maximum; and the related RSS values corresponding to the selected three first nodes are greater than a predetermined threshold.

In an example, STEP S1024 may further include, if a first node in the second set and the second node are in a NLOS environment, letting the first node in the NLOS environment send radio signals to other first nodes in the second set so as to obtain the RSS values in the other first nodes; calculating a path loss coefficient $n_{NLOS}$ of the first node in the NLOS environment on the basis of the distance between the first node and each of the other first nodes; and calculating the distance of the first node and the second node on the basis of the path loss coefficient $n_{NLOS}$ the RSS value measured in the second node on the basis of radio signals sent from the first node, and the path loss model.

In an example, it is possible to select the other first nodes in the second set so that the environment between the first node (in the NLOS environment and in the second set) and each of the other first nodes may simulate the environment between the first node and the second node.

As a result, by utilizing the techniques described in this embodiment, LOS and NLOS environments may be distinguished, so that different environmental parameters may be adopted according to the LOS and NLOS environments, and the distances between two nodes in the LOS and NLOS environments may be calculated more accurately. In this way, by utilizing these kinds of more accurately calculated distances, for example, in an example, it is possible to more accurately determine the position of a blind node. This may play an important role when, in a complicated wireless environment, the distance between two nodes needs to be accurately estimated, and the position of a node needs to be accurately positioned.

Figure 13:
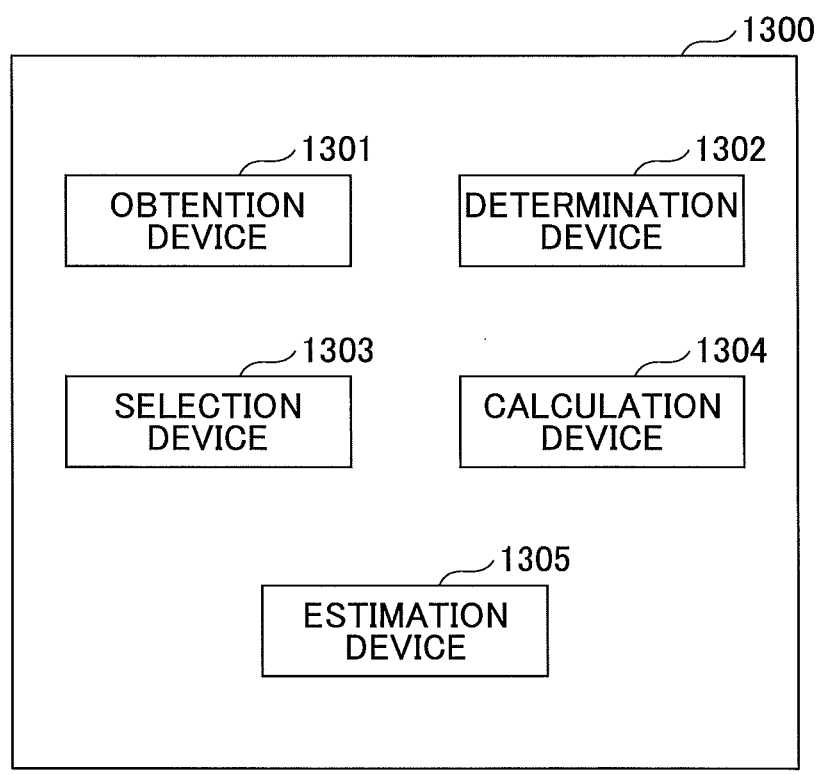
FIG. 13 illustrates a block diagram of a system for positioning a device in a wireless environment according to an embodiment of the present invention.

FIG. 13 illustrates a block diagram of a system 1300 for positioning a device in a wireless environment according to an embodiment of the present invention.

As shown in FIG. 3, a system 1300 includes an obtention device 1301, a determination device 1302, a selection device 1303, a calculation device 1304, and a estimation device 1305.

The obtention device 1301 is configured to obtain environmental parameters in the wireless environment. The determination device 1302 is configured to determine whether the environment between each first node in a first set of first nodes whose positions have been known and a second node whose position is to be positioned is a LOS or NLOS environment. The selection device 1303 is configured to select a second set from the first set. The calculation device 1304 is configured to calculate the distance between each first node of the second set and the second node on the basis of the environmental parameters and a path loss model. Here, if a first node of the second set and the second node are in the LOS environment, then the environmental parameters are those in the LOS environment, and if a first node of the second set and the second node are in the NLOS environment, then the environmental parameters are those in the NLOS environment. The estimation device 1305 is configured to estimate the position of the second node on the basis of the distance between each first node of the second set and the second node as well as the position of each first node of the second set.

As a result, by utilizing the techniques described in this embodiment, LOS and NLOS environments may be distinguished, so that different environmental parameters may be adopted according to the LOS and NLOS environments, and the distances between two nodes in the LOS and NLOS environments may be calculated more accurately. In this way, by utilizing these kinds of more accurately calculated distances, for example, in an example, it is possible to more accurately determine the position of a blind node. This may play an important role when in a complicated wireless environment, the distance between two nodes needs to be accurately estimated, and the position of a node needs to be accurately positioned.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201410059778.X filed on Feb. 21, 2014, the entire contents of which are hereby incorporated by reference.

What is claimed is:

1. A method of determining a distance between a first device and a second device in a wireless environment, comprising:

an obtaining step of obtaining environmental parameters in a LOS propagation environment;

a determination step of determining, based on a relationship between amounts of RSS jitter in the LOS propagation environment and a NLOS propagation environment, whether an environment between the first device and the second device is the LOS propagation environment or the NLOS propagation environment; and a calculation step of calculating, based on a determination result of the determination step, a distance between the first device and the second device, wherein, if the determination result is that the environment between the first device and the second device is the LOS propagation environment, then the distance between the first device and the second device is calculated based on the environmental parameters in the LOS propagation environment and a path loss model, and if the determination result is that the environment between the first device and the second device is the NLOS propagation environment, then environmental parameters in the NLOS propagation environment are obtained, and the distance between the first device and the second device is calculated based on the environmental parameters in the NLOS propagation environment and the path loss model, wherein the relationship between the amounts of RSS jitter in the LOS and NLOS propagation environments includes a relationship that the amount of RSS jitter in the NLOS propagation environment is greater than or equal to k times the amount of RSS jitter in the LOS propagation environment, and $k \geq 1$.

2. The method according to claim 1, wherein, the calculation step includes:
if the environment between the first and second devices is the NLOS propagation environment, then
selecting one or more third devices which are in the NLOS propagation environment together with the first device, so as to measure RSS values in the one or more third devices based on radio signals sent from the first device to the one or more third devices, respectively,
calculating, based on the path loss model and distances between the first device and the one or more third devices, the environmental parameters in the NLOS propagation environment; and
determining the distance between the first and second devices based on the environmental parameters in the NLOS propagation environment, a RSS value measured in the second device based on radio signals sent from the first device to the second device, and the path loss model.

3. The method according to claim 2, wherein:
the one or more third devices are selected so that environments between the first device and the one or more third devices are able to simulate the environment between the first device and the second device.

4. The method according to claim 1, wherein:
the path loss model includes $$RSS = A - \left(10n\log_{10}\frac{d}{d_0}\right),$$

wherein, RSS refers to a received signal strength value; A refers to a reference received signal strength value at a position which is between a transmitter and a receiver and from which a distance to the transmitter is $d_0$; n refers to a path loss coefficient; and d refers to a distance between the transmitter and the receiver, and
the environmental parameters include A and n.

5. The method according to claim 1, wherein:
the amount of RSS jitter includes a standard deviation of RSS values.

6. The method according to claim 1, further comprising:
a selection step of selecting plural first devices whose positions have been known, so as to calculate a distance between each of the plural first devices and the second device whose position has not been known; and
an estimation step of estimating the position of the second device based on the distance between each of the plural first devices and the second device as well as the positions of the plural first devices.

7. The method according to claim 6, wherein:
a number of the plural first devices is three,
the three first devices are selected so as to make up an acute triangle covering the second device, and
the position of the second device is estimated by utilizing a trilateration based positioning approach based on the distance between each of the three first devices and the second device as well as the positions of the three first devices.

8. The method according to claim 1, further comprising:
an exclusion step of excluding, before the determination step, a first device, wherein, a RSS value measured in the second device based on radio signals sent from this first device to the second device exceeds a predetermined threshold range.

9. A system for determining a distance between a first device and a second device in a wireless environment, comprising:
an obtaining device configured to obtain environmental parameters in a LOS propagation environment;
a determination device configured to determine, based on a relationship between amounts of RSS jitter in the LOS propagation environment and a NLOS propagation environment, whether an environment between the first device and the second device is the LOS propagation environment or the NLOS propagation environment; and
a calculation device configured to calculate, based on a determination result of the determination device, a distance between the first device and the second device, wherein, if the determination result is that the environment between the first device and the second device is the LOS propagation environment, then the distance between the first device and the second device is calculated based on the environmental parameters in the LOS propagation environment and a path loss model, and if the determination result is that the environment between the first device and the second device is the NLOS propagation environment, then environmental parameters in the NLOS propagation environment are obtained, and the distance between the first device and the second device is calculated based on the environmental parameters in the NLOS propagation environment and the path loss model,
wherein the relationship between the amounts of RSS jitter in the LOS and NLOS propagation environments includes a relationship that the amount of RSS jitter in the NLOS propagation environment is greater than or equal to k times the amount of RSS jitter in the LOS propagation environment, and k≥1.

* * * * *